United States Patent
Hsu et al.

(10) Patent No.: US 12,416,779 B2
(45) Date of Patent: Sep. 16, 2025

(54) OPTICAL SYSTEM

(71) Applicant: TDK TAIWAN CORP., Taoyuan (TW)

(72) Inventors: Chan-Jung Hsu, Taoyuan (TW); I-Mei Huang, Taoyuan (TW); Yi-Ho Chen, Taoyuan (TW); Shao-Chung Chang, Taoyuan (TW); Ichitai Moto, Taoyuan (TW); Chen-Chi Kuo, Taoyuan (TW); Ying-Jen Wang, Taoyuan (TW); Ya-Hsiu Wu, Taoyuan (TW); Wei-Jhe Shen, Taoyuan (TW); Chao-Chang Hu, Taoyuan (TW); Che-Wei Chang, Taoyuan (TW); Sin-Jhong Song, Taoyuan (TW); Shu-Shan Chen, Taoyuan (TW); Chih-Wei Weng, Taoyuan (TW); Chao-Hsi Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 42 days.

(21) Appl. No.: 18/344,108

(22) Filed: Jun. 29, 2023

(65) Prior Publication Data

US 2023/0341653 A1 Oct. 26, 2023

Related U.S. Application Data

(63) Continuation of application No. 17/155,964, filed on Jan. 22, 2021, now Pat. No. 11,829,001.
(Continued)

(51) Int. Cl.
*G02B 7/09* (2021.01)
*G02B 27/64* (2006.01)

(52) U.S. Cl.
CPC ............. *G02B 7/09* (2013.01); *G02B 27/646* (2013.01)

(58) Field of Classification Search
None
See application file for complete search history.

(56) References Cited

U.S. PATENT DOCUMENTS

| 7,519,282 B2 | 4/2009 | Shin et al. |
| 10,976,516 B2 * | 4/2021 | Weng ................ G03B 3/10 |

(Continued)

FOREIGN PATENT DOCUMENTS

| CN | 110352371 A | 10/2019 |
| JP | 2017003934 A | 1/2017 |

(Continued)

OTHER PUBLICATIONS

Office Action with partial Search Report issued in corresponding EP Application No. 21152963.1 on Jun. 17, 2021 (13 pages).
(Continued)

*Primary Examiner* — Stephone B Allen
*Assistant Examiner* — Tamara Y. Washington
(74) *Attorney, Agent, or Firm* — Muncy, Geissler, Olds & Lowe, P.C.

(57) ABSTRACT

An optical system includes an optical module with a main axis is provided. The optical module includes a fixed portion, a movable portion, a driving mechanism, and a supporting assembly. The movable portion is connected to an optical element and is movable relative to the fixed portion. The driving mechanism drives the movable portion to move relative to the fixed portion. The supporting assembly is connected to the movable portion and the fixed portion. When viewed along a direction that is parallel with the main axis, the fixing portion is a polygonal structure with a first side, a second side, a third side, and a fourth side. The first side is parallel with the third side, the second side is parallel with the fourth side, and the first side is not parallel with the second side.

20 Claims, 16 Drawing Sheets

Related U.S. Application Data

(60) Provisional application No. 63/121,415, filed on Dec. 4, 2020, provisional application No. 63/058,932, filed on Jul. 30, 2020, provisional application No. 63/056,183, filed on Jul. 24, 2020, provisional application No. 63/017,313, filed on Apr. 29, 2020, provisional application No. 62/964,377, filed on Jan. 22, 2020.

(56) References Cited

U.S. PATENT DOCUMENTS

| | | |
|---|---|---|
| 11,782,234 B2 * | 10/2023 | Cho .................. H02K 1/34 359/557 |
| 2006/0017815 A1 | 1/2006 | Stavely et al. |
| 2007/0024739 A1 | 2/2007 | Konno |
| 2008/0187301 A1 | 8/2008 | Takahashi |
| 2008/0266404 A1 | 10/2008 | Sato |
| 2010/0166401 A1 | 7/2010 | Akutsu |
| 2011/0217029 A1 | 9/2011 | Wu et al. |
| 2011/0221915 A1 | 9/2011 | Takano et al. |
| 2012/0099212 A1 * | 4/2012 | Wu .................. H04N 23/55 359/824 |
| 2012/0249815 A1 | 10/2012 | Bohn et al. |
| 2013/0045002 A1 * | 2/2013 | Zhang .................. G03B 11/043 396/429 |
| 2015/0286033 A1 | 10/2015 | Osborne |
| 2015/0350500 A1 | 12/2015 | Gutierrez et al. |
| 2017/0242225 A1 | 8/2017 | Fiske |
| 2017/0272658 A1 | 9/2017 | Ito |
| 2018/0364446 A1 | 12/2018 | Osaka et al. |
| 2019/0058832 A1 | 2/2019 | Huang et al. |

FOREIGN PATENT DOCUMENTS

| | | |
|---|---|---|
| KR | 1020150071408 A | 6/2015 |
| WO | WO-2018/202819 A1 | 11/2018 |
| WO | WO-2020069391 A1 | 4/2020 |

OTHER PUBLICATIONS

European Search Report mailed Oct. 11, 2021 in EP Application No. 21152963.1, 15 pages.

Extended Search Report dated Apr. 26, 2024 issued in counterpart European Application No. 23211699.6 (full English text).

Search Report of corresponding EP Application No. 23211699.6 dated Feb. 22, 2024, 19 pages.

* cited by examiner

OPTICAL SYSTEM

CROSS REFERENCE TO RELATED APPLICATIONS

This application is a Continuation Application of U.S. patent application Ser. No. 17/155,964, filed on Jan. 22, 2021, which claims the benefit of U.S. Provisional Application No. 62/964,377, filed on Jan. 22, 2020, U.S. Provisional Application No. 63/017,313, filed on Apr. 29, 2020, U.S. Provisional Application No. 63/056,183, filed on Jul. 24, 2020, U.S. Provisional Application No. 63/058,932, filed on Jul. 30, 2020, and U.S. Provisional Application No. 63/121,415, filed on Dec. 4, 2020, the entirety of which are incorporated by reference herein.

BACKGROUND OF THE INVENTION

Field of the Invention

The present invention relates to an optical system.

Description of the Related Art

As technology has developed, optical elements and optical systems, which are used for driving optical elements, have become miniaturized. Many electronic devices (such as tablet computers and smartphones) are equipped with at least one optical element, at least one optical system, and at least one light-detection element for capturing images and recording videos. When a user uses an electronic device, shock or vibration may occur, and this may cause the images or videos to come out blurry. However, as the demand for higher quality in images and videos is increasing, an optical system that is able to perform displacement-correction and shake-compensation has been developed.

The optical system may drive the optical element to move along a direction that is parallel with the optical axis to autofocus (AF) on the scene to be shot. Additionally, the optical system may also drive the optical element to move along a direction that is perpendicular to the optical axis to perform optical image stabilization (OIS), which compensates for the deviation of the image caused by shaking or impact, and solve the problem of blurry images and videos. AF and OIS may enhance the quality of the image.

BRIEF SUMMARY OF THE INVENTION

Some embodiments of the invention provide an optical system including an optical module with a main axis. The optical module includes a fixed portion, a movable portion, a driving mechanism, and a supporting assembly. The movable portion is connected to an optical element and is movable relative to the fixed portion. The driving mechanism drives the movable portion to move relative to the fixed portion. The supporting assembly is connected to the movable portion and the fixed portion. When viewed along a direction that is parallel with the main axis, the fixed portion is a polygonal structure with a first side, a second side, a third side, and a fourth side. The first side is parallel with the third side, the second side is parallel with the fourth side, and the first side is not parallel with the second side.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
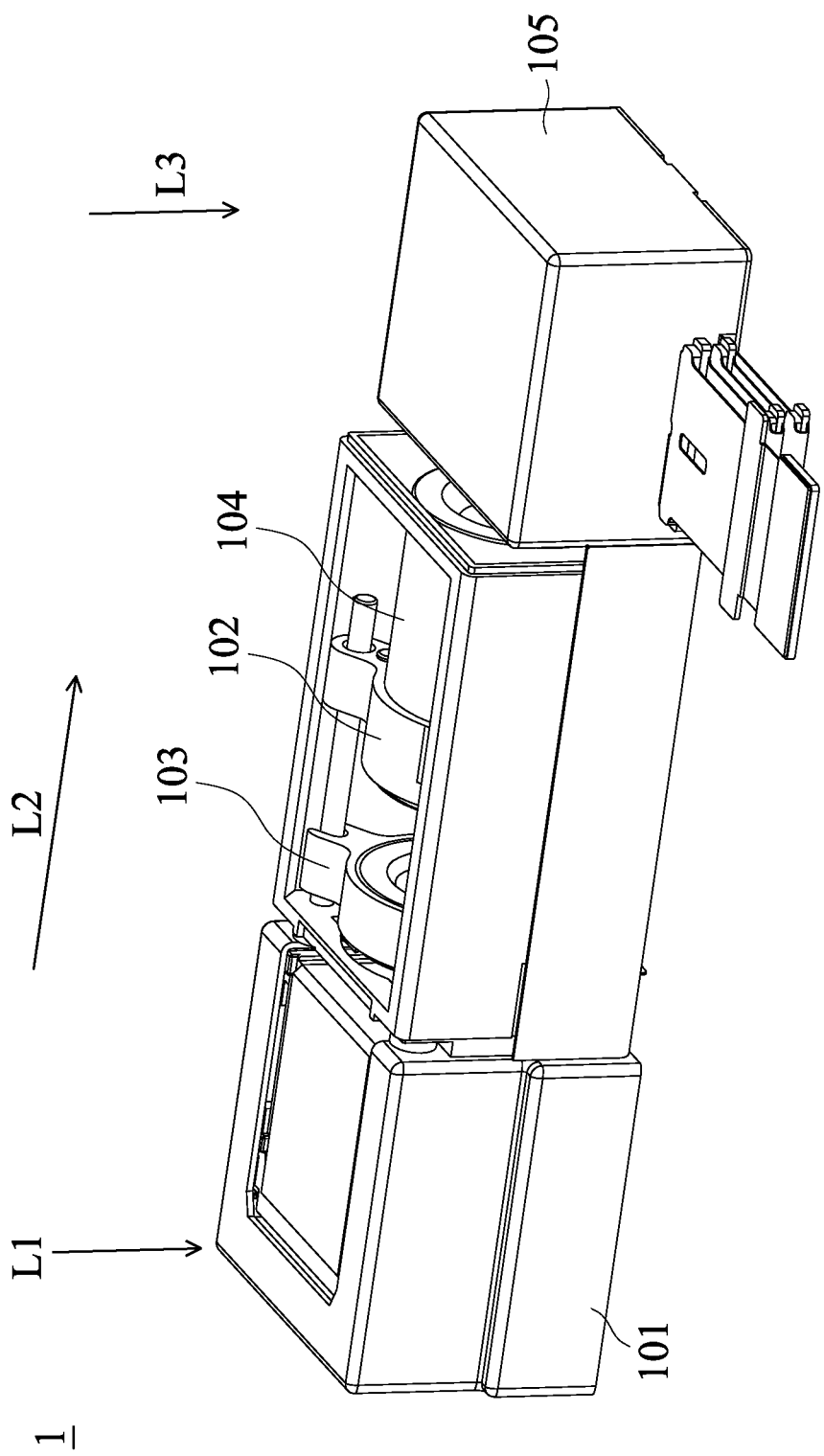
FIG. 1 is a perspective view of the optical system.
Figure 2:
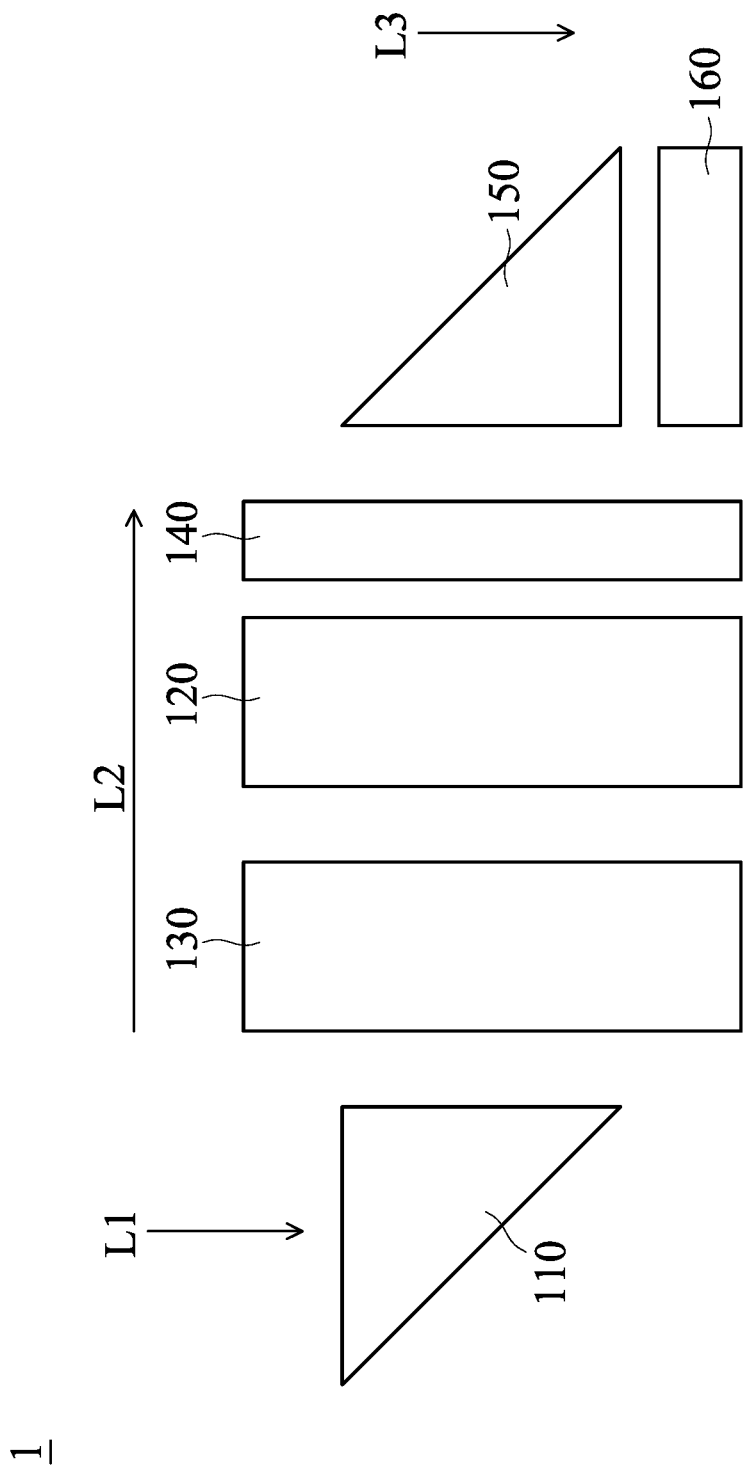
FIG. 2 is a schematic diagram of optical elements in the optical system.

According to some embodiments, an optical system 1 is provided. FIG. 1 is a perspective view of the optical system 1. FIG. 2 is a schematic diagram of the optical elements in the optical system 1. For simplicity, only the optical elements are shown in FIG. 2. The optical system 1 may be a periscope optical system. The optical system 1 includes a first optical module 101, a second optical module 102, a third optical module 103, a fourth optical module 104, and a fifth optical module 105.

A light above the first optical module 101 enters the first optical module 101 along a first incident direction L1, and is adjusted to pass through the third optical module 103, the second optical module 102, and the fourth optical module 104 sequentially along a second incident direction L2 by the first optical module 101, and the optical path of the light is adjusted to be along a third incident direction L3 in the fifth optical module 105, and imaging in the fifth optical module 105.

The first optical module 101 and the fifth optical module 105 may include a first optical element 111 and a fifth optical element 115, respectively. The first optical element 111 and the fifth optical element 115 may be a prism, a minor, a refractive prism, or a beam splitter, etc. By rotating the first optical element 111 and the fifth optical element 115, the optical path of the light may be changed. The second optical module 102, the third optical module 103, and the fourth optical module 104 may respectively include a second optical element 112, a third optical element 113, and a fourth optical element 114. The second optical module 102, the third optical module 103, and the fourth optical module 104 may drive the second optical element 112, the third optical element 113, and the fourth optical element 114 respectively. The second optical element 112, the third optical element 113, and the fourth optical element 114 may be one or more lenses, optical lenses, etc., and are made of materials such as glass and resin. The fifth optical module 105 may also include a sixth optical element 116. The sixth optical element 116 may be an image sensor (or called a photosensitive element), etc., for example, a charge-coupled Device (CCD).

In some embodiments, an optical element corresponding to a focal length of the first optical element 111 that is not zero (not shown, for example, one or more lens, optical lens, etc.) may be provided above the first optical element 111. In other words, the optical element whose focal length is not zero may be fixedly connected to the first optical element 111, and arranged along the first incident direction L1 with the first optical element 111, and the shooting effect of the optical system 1 may be enhanced by increasing the quantity of the optical element.

In some embodiments, the first optical module 101 and the fifth optical module 105 may perform yawing and pitching, respectively. In some embodiments, the first optical module 101 may also perform pitching, and the fifth optical module 105 may perform yawing. In some embodiments, the first optical module 101 and the fifth optical module 105 may both perform pitching. In some embodiments, the first optical module 101 and the fifth optical module 105 may both perform yawing. In some embodiments, the second optical module 102 and the third optical module 103 may achieve the functions of zooming and auto focusing (AF), respectively. In some embodiments, the second optical module 102 may also perform auto focusing, and the third optical module 103 may perform zooming. In other words, terms such as yawing, pitching, zooming, and auto focusing, etc., do not constitute limitations.

In some embodiments, the fourth optical module 104 may achieve the function of Optical Image Stabilization (OIS). In some embodiments, the position of the fourth optical module 104 may be changed, for example, the fourth optical module 104 is disposed between the third optical module 103 and the fifth optical module 105. In some embodiments, the fourth optical module 104 may be integrated into the second optical module 102 or the third optical module 103, and the functions of auto focusing and optical image stabilization may be simultaneously achieved through a single second optical module 102 or a single third optical module 103. In some embodiments, the fourth optical module 104 may be omitted.

Figure 3:
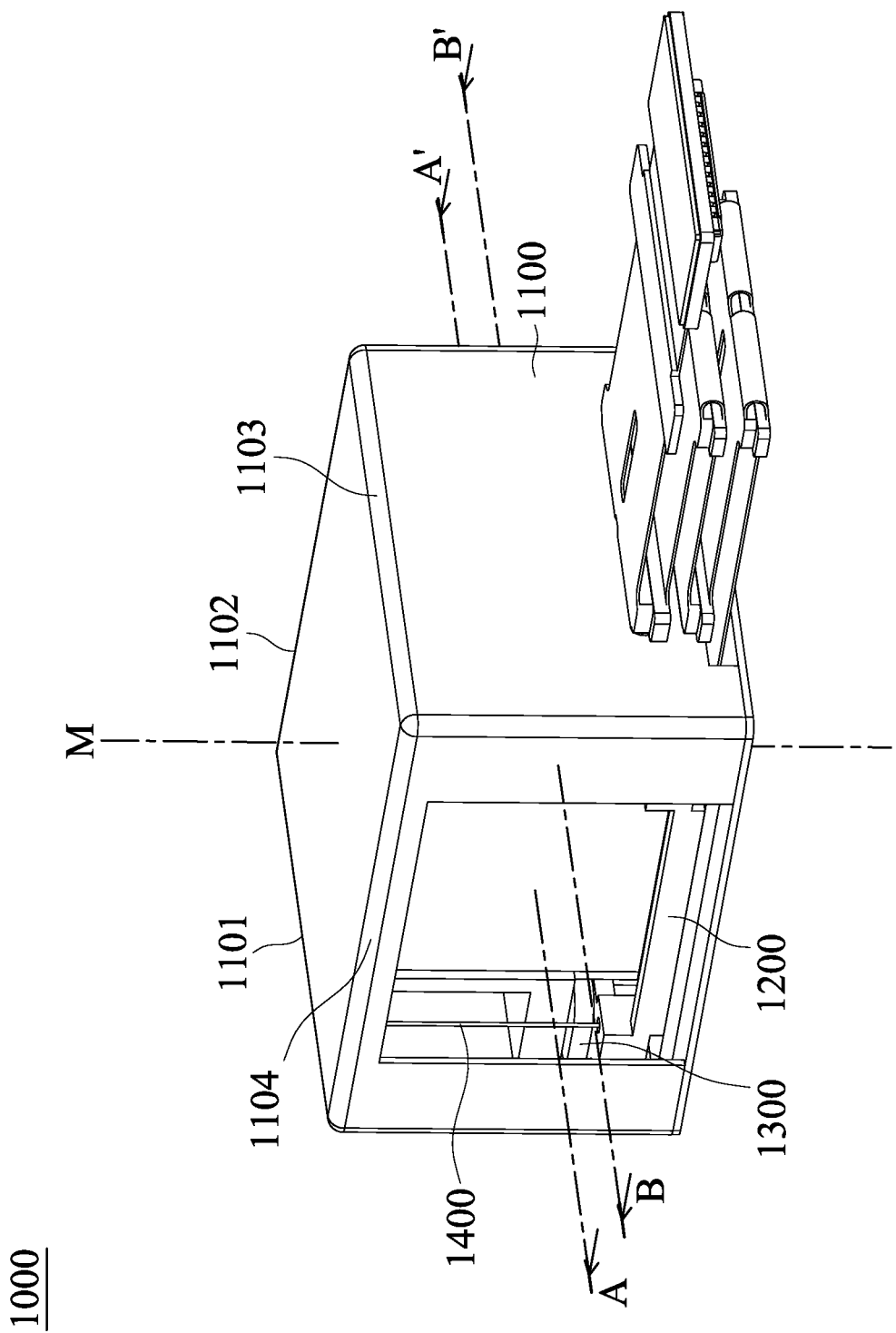
FIG. 3 is a perspective view of an optical module according to an embodiment of the disclosure.
Figure 4:
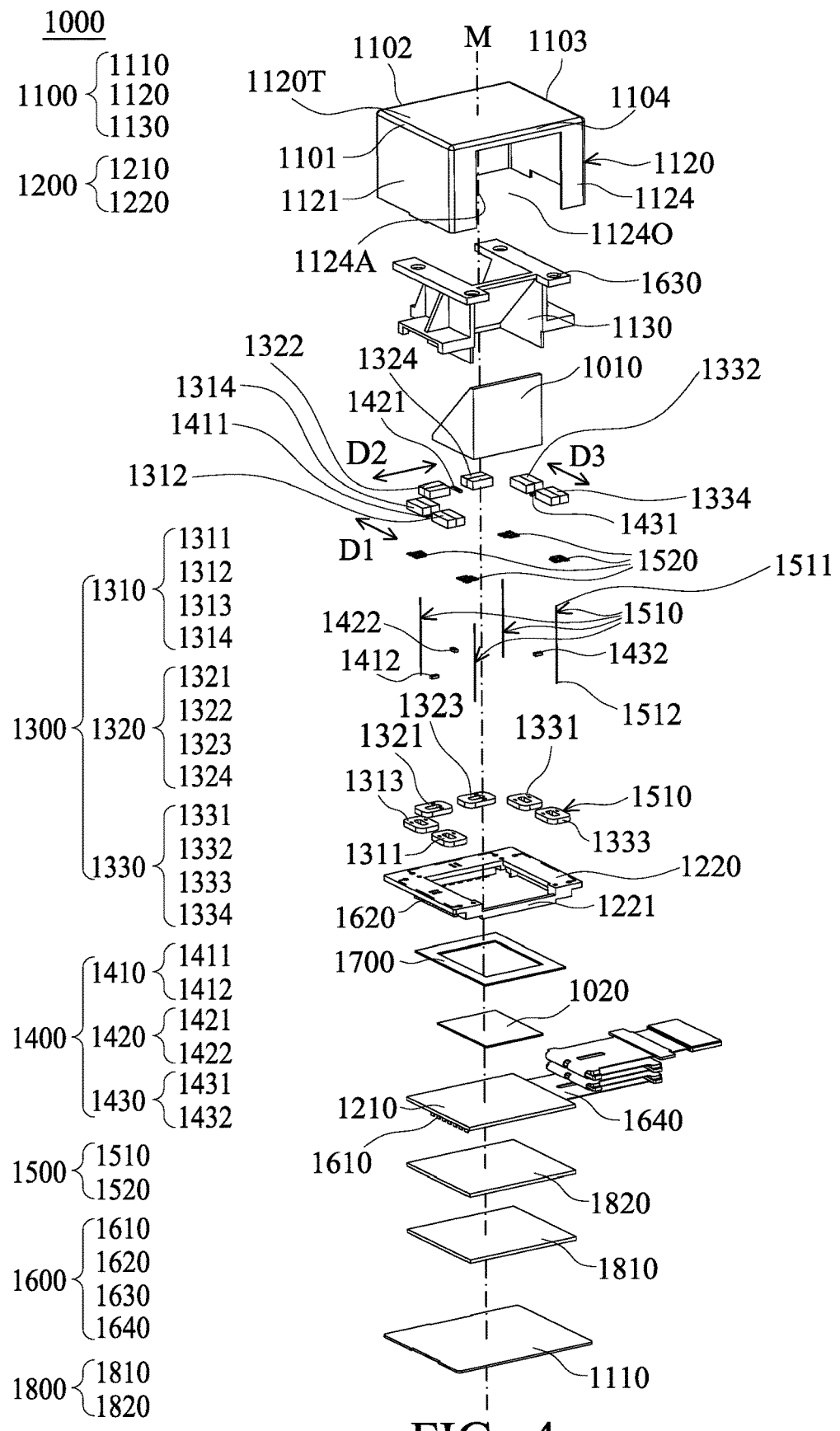
FIG. 4 is an exploded view of the optical module according to an embodiment of the disclosure.
Figure 5:
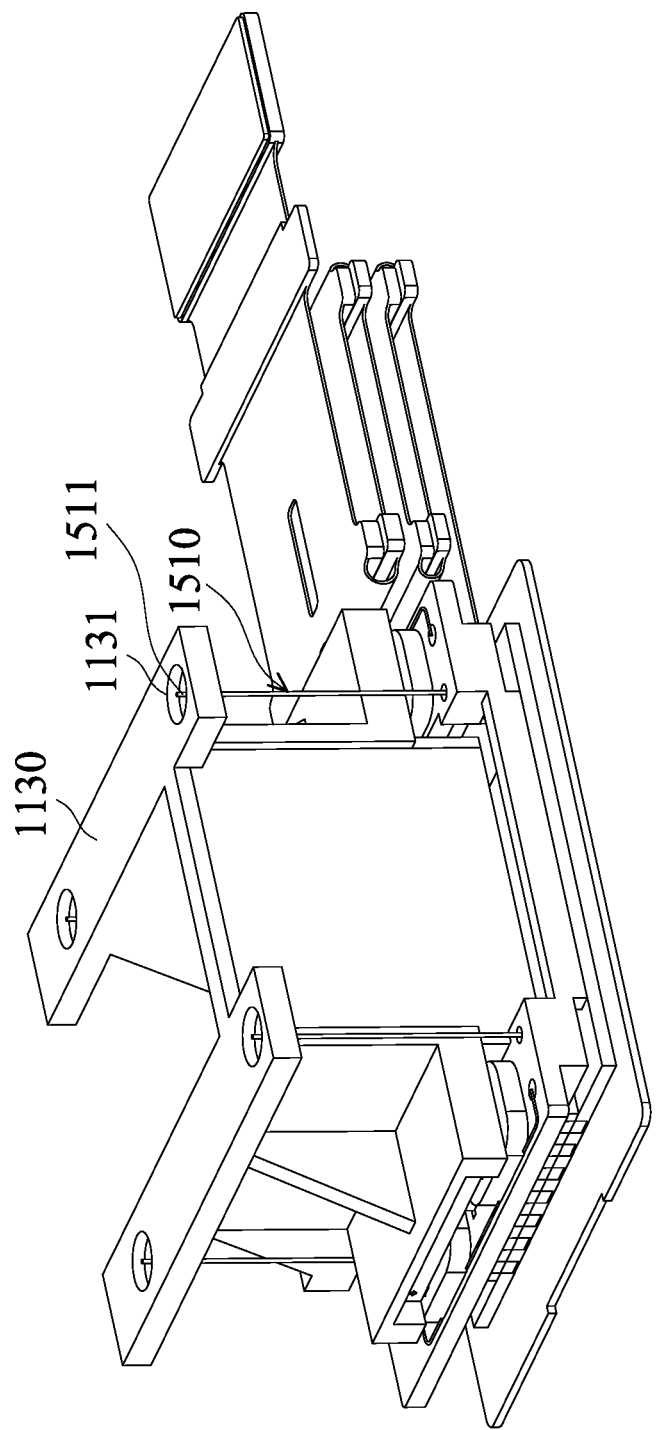
FIG. 5 is a perspective view of a partial structure of the optical module according to an embodiment of the disclosure.
Figure 6:
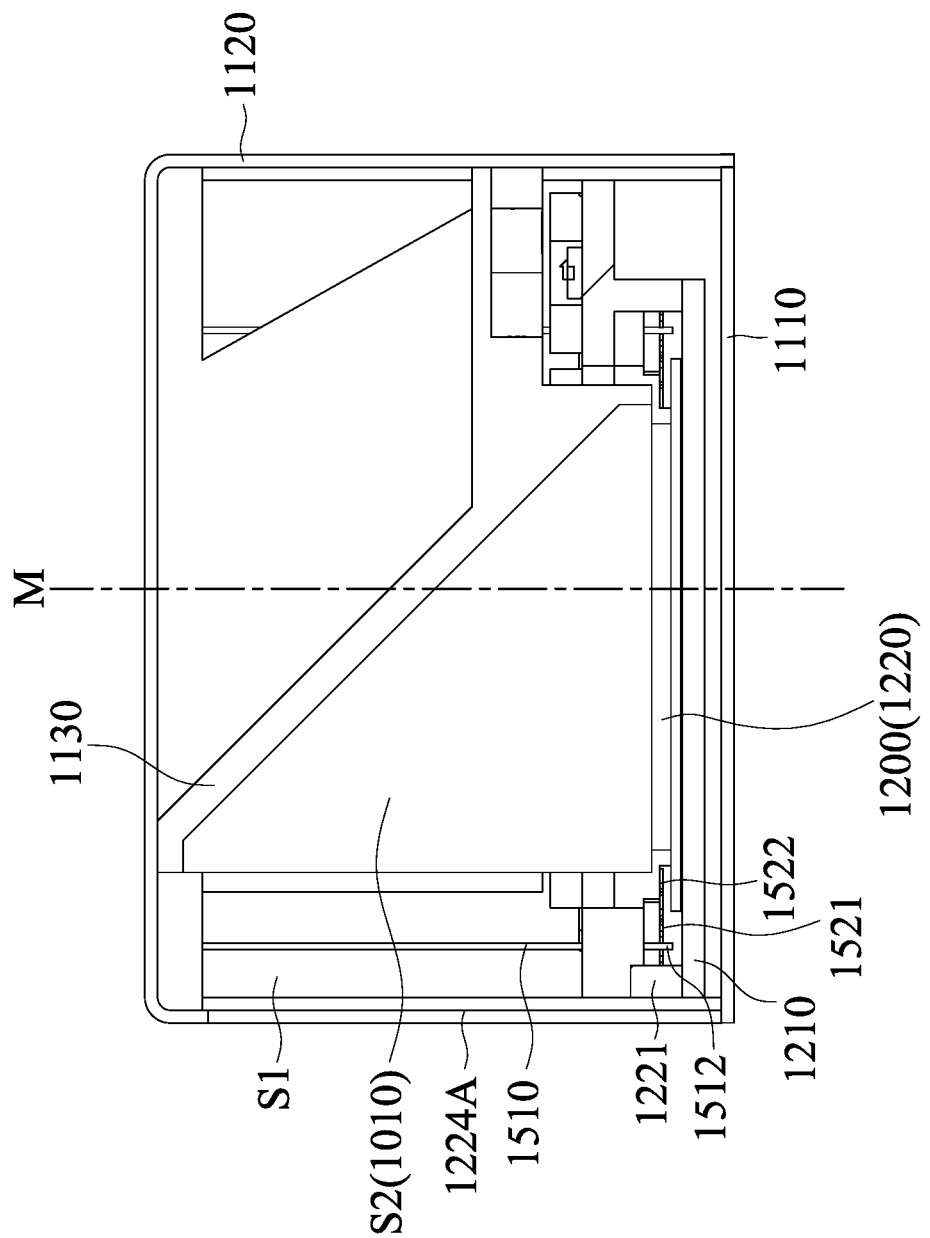
FIG. 6 is a cross-sectional view of the optical module taken along the line A-A' in FIG. 3.
Figure 7:
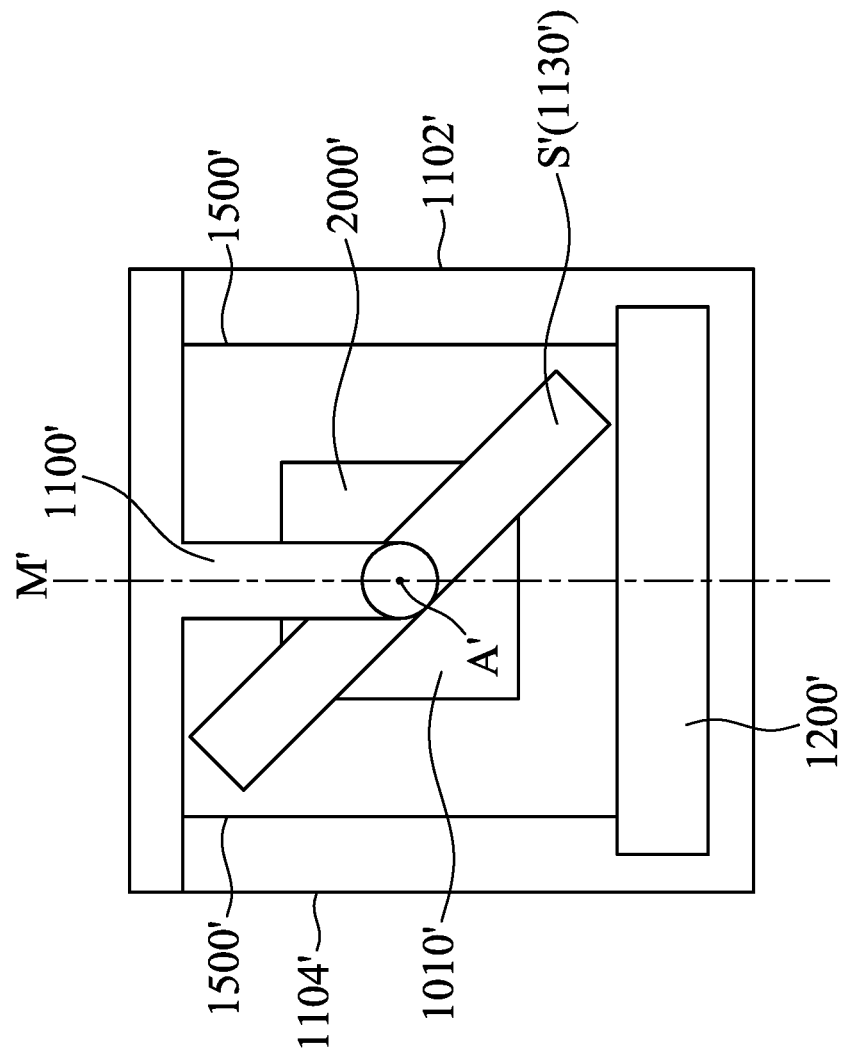
FIG. 7 is a schematic diagram of a partial structure of an optical module according to another embodiment of the disclosure.

Refer to FIG. 3 to FIG. 7. FIG. 3 is a perspective view of an optical module 1000 according to an embodiment of the present disclosure. FIG. 4 is an exploded view of the optical module 1000 according to an embodiment of the disclosure. FIG. 5 is a perspective view a partial structure of the optical module 1000 according to an embodiment of the disclosure. FIG. 6 is a cross-sectional view of the optical module 1000 taken along the line A-A' in FIG. 3. FIG. 7 is a schematic diagram of a partial structure of an optical module 1000' according to another embodiment of the disclosure. In the following embodiments, the optical module 1000 has a similar structure to the fifth optical module 105 described above. The optical module 1000 has a main axis M, and includes an optical path adjustment element 1010, an optical element 1020, a fixed portion 1100, a movable portion 1200, a driving mechanism 1300, a position sensing module 1400, a supporting assembly 1500, a circuit assembly 1600, a dust-proof assembly 1700, a heat dissipation assembly 1800, and a damping assembly 1900 (shown in FIG. 9).

The optical path adjustment element 1010 has a structure similar to the fifth optical element 115 mentioned above. In some embodiments, the optical adjustment element 1010 is a right-angle prism, but is not limited to this. The optical element 1020 has a structure similar to the sixth optical element 116 mentioned above. In some embodiments, the optical element 1020 is an image sensor, but is not limited to this.

When viewed along a direction that is parallel with the main axis M, the fixed portion 1100 is a polygonal structure with a first side 1101, a second side 1102, a third side 1103 and a fourth side 1104. The first side 1101 is parallel with the third side 1103, the second side 1102 is parallel with the fourth side 1104, and the first side 1101 and the second side 1102 are not parallel.

As shown in FIG. 3 to FIG. 5, the fixed portion 1100 includes a base 1110, an outer frame 1120, and a frame 1130. The base 1110 has a plate-like structure and is perpendicular to the main axis M. The outer frame 1120 and the base 1110 are arranged along the main axis M. The outer frame 1120 includes a top wall 1120T, a first side wall 1121, a second side wall 1122, a third side wall 1123, and a fourth side wall 1124. The top wall 1110T has a plate-like structure and is not parallel with the main axis M. In more detail, the top wall 1121T is parallel with the base 1110. The first side wall 1121 extends from an edge of the top wall 1120T and is not parallel with the top wall 1120T. When viewed along a direction that is parallel with the main axis M, the first side wall 1121 is disposed on the first side 1101. The second side wall 1122 extends from an edge of the top wall 1120T and is not parallel with the top wall 1120T. When viewed along a direction that is parallel with the main axis M, the second side wall 1122 is disposed on the second side 1102. The third side wall 1123 extends from an edge of the top wall 1120T and is not parallel with the top wall 1120T. When viewed along a direction that is parallel with the main axis M, the third side wall 1123 is disposed on the third side 1103. The fourth side wall 1124 extends from an edge of the top wall 1120T and is not parallel with the top wall 1120T. The fourth side wall 1124 has an opening 11240 corresponding to the incident light L. The opening 11240 is disposed between the outer frame 1120 and the base 1110. When viewed along a direction that is parallel with the main axis M, the fourth side wall 1124 is disposed on the fourth side 1104.

As shown in FIG. 6, the base 1110 and the outer frame 1120 form a first accommodating space S1. The first accommodating space S1 accommodates the movable portion 1200 and the frame 1130. There is a second accommodating space S2 between the frame 1130 and the movable portion 1200 for accommodating the optical path adjustment element 1010. Although in this embodiment, the frame 1130 is connected and fixed to the outer frame 1120, and the optical path adjustment element 1010 is connected and fixed to the frame 1130, it is not limited to this. In some embodiments, the frame 1130 may be included in the movable portion 1200, and the frame 1130 and the optical path adjustment element 1010 may move relative to the fixed portion 1100.

As shown in FIG. 7, the optical module 1000 has a similar structure to the optical module 1000, except that the optical module 1000' includes an anti-vibration driving mechanism 2000' and a frame 1130' has an inclined surface S' that may move relative to the fixed portion 1100'. The optical path adjustment element 1010' is fixedly disposed on the inclined surface S' of the frame 1130'. When viewed along a direction that is parallel with the main axis M', the anti-vibration driving mechanism 2000' is disposed on the second side 1102', and the anti-vibration driving mechanism 2000' and the driving mechanism 1300' at least partially overlap. The anti-vibration driving mechanism 2000' may drive the optical path adjustment element 1010' to move relative to the fixed portion 1100'. In more detail, according to the configuration of the anti-vibration driving mechanism 2000', the optical path adjustment element 1010' may be controlled to be yawing and pitching. In the embodiment shown in FIG. 7, the anti-vibration driving mechanism 2000' drives the optical path adjustment element 1010' to rotate in a first rotating axis A' relative to the fixed portion 1100', and the first rotating axis A' is parallel with the second side 1102'.

Back to FIG. 3 to FIG. 6, the movable portion 1200 is connected to the optical element 1020 and may move relative to the fixed portion 1100. The movable portion 1200 includes a pedestal 1210 and a holder 1220. The pedestal 1210 is connected to the optical element 1020 and has a plate-like structure. The holder 1220 is fixedly disposed on the pedestal 1210, and has a shielding portion 1221, which is arranged near the fourth side 1104. In more detail, when viewed along a direction that is parallel with the main axis M, the light enters the optical module 1000 from the fourth side 1104, and enters the optical element 1020 through the optical path adjustment element 1010. The optical path adjustment element 1010 is configured to adjust the light traveling in the direction that is parallel with the first side 1101 to travel in a direction that is parallel with the main axis M. The shielding portion 1221 is a protruding structure which protrudes along a direction that is parallel with the main axis M. When viewed along the direction that is parallel with the first side 1101, the shielding portion 1221 and the optical element 1020 at least partially overlap, so a stray light may be shielded, and the stray light may not enter the optical element 1020.

The shielding portion 1221 may also be used as a stopping portion 1221. An inner side wall located on the fourth side 1104 and close to the stopping portion 1221 may be used as a stopping surface 1124A, so the stopping portion 1221 and the stopping surface 1124A may form a stopping assembly 1600 configured to restrict the movable portion 1200 to move within a moving range relative to the fixed portion 1100. In more detail, when the stopping portion 1221 touches the stopping surface 1124A, the movable portion 1200 stops moving, so the movable portion 1200 moving along a direction that is not parallel with the main axis M may be restricted within a moving range relative to the fixed portion 1100.

The dust-proof assembly 1700 may be adhesive, glue or the like, which has a higher viscosity. The dust-proof assembly 1700 is at least partly disposed on the pedestal 1210 and at least partly disposed on the holder 1220. When viewed along a direction that is parallel with the main axis M, the dust-proof assembly 1700 does not overlap the optical element 1020, and the dust-proof assembly 1700 is located around the optical element 1020. In more detail, the dust-proof assembly 1700 has a closed structure surrounding the optical element 1020. Due to the higher viscosity of the dust-proof assembly 1700, the dust-proof assembly 1700 may capture foreign objects and restrict the path of the foreign objects to prevent the foreign objects from contacting the optical element 1020.

The heat dissipation assembly 1800 is configured to improve the heat dissipation efficiency of the optical element 1020 and the driving mechanism 1300. The heat dissipation assembly 1800 includes a first heat dissipation element 1810 and a second heat dissipation element 1920. The first heat dissipation element 1810 has a plate-shaped structure with a thermal conductivity greater than 10 W/(m×K), and may be made of carbon fiber, ceramic or metal. The first heat dissipation element 1810 is closer to the optical element 1020 than the top wall 1120T, and the first heat dissipation element 1810 and the base 1110 may have an integrated structure.

The second heat dissipation element 1820 has a plate-shaped structure with a thermal conductivity greater than 10 W/(m×K), and is fixedly disposed on the pedestal 1210 and is at least partially embedded in the pedestal 1210. The second heat dissipation element 1820 has a magnetically permeable material to improve the driving efficiency of the driving mechanism 1300. In more detail, the second heat dissipation element 1820 corresponds to the driving mechanism 1300, and because of the magnetic material, the second heat dissipation element 1820 may generate an attractive force or a repulsive force to improve the driving efficiency of the driving mechanism 1300. The second heat dissipation element 1820 is parallel with the first heat dissipation element 1810, and there is a gap greater than zero between the first heat dissipation element 1810 and the second heat dissipation element 1820.

The driving mechanism 1300 drives the movable portion 1200 to move relative to the fixed portion 1100. The driving mechanism 1300 includes a first driving assembly 1310, a second driving assembly 1320, and a third driving assembly 1330. The first driving assembly 1310 is disposed on the first side 1101, and includes a first coil 1311, a first magnetic element 1312, a second coil 1313, and a second magnetic element 1314. The first magnetic element 1312 corresponds to the first coil 1311, and the first coil 1311 and the first magnetic element 1312 are arranged along a direction that is parallel with the main axis M. The second coil 1313 and the first coil 1311 are arranged along a first direction D1, and the first direction D1 is parallel with the first side 1101. The second magnetic element 1314 corresponds to the second coil 1313, and the second magnetic element 1314 and the first magnetic element 1312 are arranged along the first direction D1. The second driving assembly 1320 is disposed on the second side 1102, and includes a third coil 1321, a third magnetic element 1322, a fourth coil 1323, and a fourth magnetic element 1324. The third magnetic element 1322 corresponds to the third coil 1321, and the third coil 1321 and the third magnetic element 1322 are arranged along a direction that is parallel with the main axis M. The fourth coil 1323 and the third coil 1321 are arranged along the second direction D2, and the second direction D2 is parallel with the second side 1102. The fourth magnetic element 1324 corresponds to the fourth coil 1323. The third driving assembly 1330 is disposed on the third side 1103, and includes a fifth coil 1331, a fifth magnetic element 1332, a sixth coil 1333, and a sixth magnetic element 1334. The fifth magnetic element 1332 corresponds to the fifth coil 1331, and the fifth coil 1331 and the fifth magnetic element 1332 are arranged along a direction that is parallel with the main axis M. The sixth coil 1333 and the fifth coil 1331 is arranged along a third direction D3, and the third direction D3 is parallel with the third side 1103. The sixth magnetic element 1334 corresponds to the sixth coil 1333. A winding axis of the second coil 1313 is parallel with a winding axis of the first coil 1311. The winding axis of the first coil 1311 is parallel with the main axis M. A winding axis of the fourth coil 1323 is parallel with a winding axis of the third coil 1321. The winding axis of the fourth coil 1323 is parallel with the main axis M. A winding axis of the sixth coil 1333 is parallel with a winding axis of the fifth coils 1331. The winding axis of the sixth coil 1333 is parallel with the main axis M. When viewed along a direction that is parallel with the main axis M, the driving mechanism 1300 is not disposed on the fourth side 1104. The driving assembly is at least partially fixedly disposed on the holder 1220.

In some embodiments, the first coil 1311, the second coil 1313, the third coil 1321, the fourth coil 1323, the fifth coil 1331, and the sixth coil 1333 are disposed on the holder 1220 of the movable portion 1200, the first magnetic element 1312, the second magnetic element 1314, the third magnetic element 1322, the fourth magnetic element 1324, the five magnetic elements 1332, and the sixth magnetic element 1334 are disposed on the frame 1130 of the fixed portion 1100, but not limited to this. In some embodiments, the first coil 1311, the second coil 1313, the third coil 1321, the fourth coil 1323, the fifth coil 1331, and the sixth coil 1333 are disposed on the frame 1130 of the fixed portion 1100, and the first magnetic element 1312, the second magnetic element 1314, the third magnetic element 1322, the fourth magnetic element 1324, the fifth magnetic element 1332, and the sixth magnetic element 1334 are disposed on the holder 1220 of the movable portion 1200.

In addition, in the embodiment of FIG. 4, the first driving assembly 1310, the second driving assembly 1320, and the third driving assembly 1330 respectively include two magnetic elements, but it is not limited to this. In some embodiments, the first magnetic element 1312 and the second magnetic element 1314 have an integrally formed structure, the third magnetic element 1322 and the fourth magnetic element 1324 have an integrally formed structure, and the fifth magnetic element 1332 and the sixth magnetic element 1334 have an integrated structure.

The position sensing module 1400 is configured to sense the movement of the movable portion 1200 relative to the fixed portion 1100, and includes a first position sensing assembly 1410, a second position sensing assembly 1420, and a third position sensing assembly 1430. The first position sensing assembly 1410 has a first reference element 1411 and a first sensing element 1412, and the first sensing element 1412 is configured to sense a first magnetic field generated by the first reference element 1411. When viewed along a direction that is parallel with the main axis M, the first sensing element 1412 and the first reference element 1411 are disposed on the first side 1101. The second position sensing assembly 1420 has a second reference element 1421 and a second sensing element 1422, and the second sensing element 1422 is configured to sense the second magnetic field generated by the second reference element 1421. When viewed along a direction that is parallel with the main axis M, the second sensing element 1422 and the second reference element 1421 are disposed on the second side 1102. The third position sensing assembly 1430 has a third reference element 1431 and a third sensing element 1432. The third sensing element 1432 is configured to sense a third magnetic field generated by the third reference element 1431. When viewed in a direction that is parallel with the main axis M, the third sensing element 1432 and the third reference element 1431 are disposed on the third side 1103. When viewed along a direction that is parallel with the main axis M, the position sensing module 1400 is not disposed on the fourth side 1104.

In some embodiments, the first reference element 1411, the second reference element 1421, and the third reference element 1431 are respectively magnetic elements, which are disposed on the frame 1130. When viewed along a direction that is perpendicular to the main axis M, the first reference element 1411 is disposed between the first magnetic element 1312 and the second magnetic element 1314, the second reference element 1421 is disposed between the third magnetic elements 1322 and the fourth magnetic element 1324, the third reference element 1431 is arranged between the fifth magnetic element 1332 and the sixth magnetic element 1334. The first sensing element 1412, the second sensing element 1422, and the third sensing element 1432 may be, for example, a Hall effect sensor, a magnetoresistive (MR) sensor, or a Fluxgate, etc. The first sensing element 1412, the second sensing element 1422, and the third sensing element 1432 are disposed on the holder 1220. When viewed along a direction that is perpendicular to the main axis M, the first sensing element 1412 is disposed between the first coil 1311 and the second coil 1313, the second sensing element 1422 is located between the third coil 1321 and the fourth coil 1323, and the third sensing element 1432 is located between the fifth coil 1331 and the sixth coil 1333 to respectively sense the first magnetic field of the first reference element 1411, the second magnetic field of the second reference element 1421, and the third magnetic field of the third reference element 1431 to obtain the position of the holder 1220 relative to the frame 1130.

In some embodiments, three sets of position sensing assemblies are provided (a first position sensing assembly 1410, a second position sensing assembly 1420, and a third position sensing assembly 1430) to sense the movement and rotation of the movable portion 1200 relative to the fixed portion 1100, but not limited to this. In some embodiments, only two sets of position sensing assemblies that are not parallel with each other may be provided to sense the movement of the movable portion 1200 relative to the fixed portion 1100.

The above-mentioned example with the position sensing module 1400 is driven by a closed-loop control. That is, the position sensing module 1400 is used to sense whether the movable portion 1200 reaches the expected position, and if it does not reach the expected position, a command may be made by a controller of the driving mechanism 1300 to make corrections until the movable portion 1200 reaches the expected position. However, the present disclosure is not limited to this. It may also be driven by an open-loop control without the position sensing module 1400 with the position feedback, and by establishing a database in advance, then the movable portion 1200 may be driven directly to the expected position.

Figure 8:
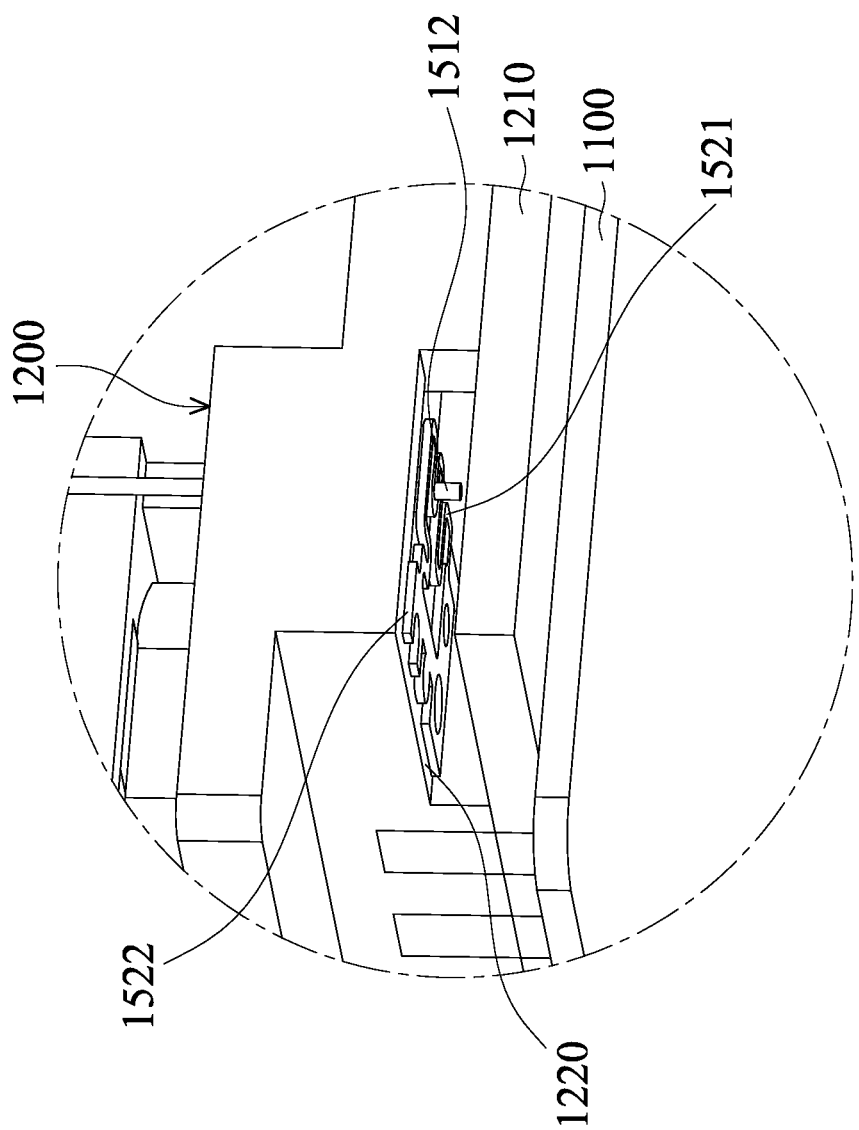
FIG. 8 is an enlarged schematic diagram of the framed part of FIG. 5.

Next, refer to FIG. 4 to FIG. 6, and FIG. 8. FIG. 8 is an enlarged schematic view of the framed part of FIG. 5. The supporting assembly 1500 is connected to the movable portion 1200 and the fixed portion 1100. The supporting assembly 1500 includes a first elastic element 1510 and a second elastic element 1520. The first elastic element 1510 has a long strip structure extending along a direction that is parallel with the main axis M, and pass through the frame 1130 and the holder 1220. The first elastic element 1510 has a first end portion 1511 and a second end portion 1512. The first end portion 1511 is fixed to the frame 1130, and is located between the frame 1130 and the top wall 1120T, but is not in direct contact with the top wall 1120T. In more detail, the frame 1130 has a groove 1131 to accommodate the first end portion 1511. The second end portion 1512 is connected to the second elastic element 1520.

As shown in FIG. 8, the second elastic element 1520 has a plate-like structure, which is not parallel with the first elastic element 1510. The second elastic element 1520 has an impact absorbing portion 1521 and a fixed end portion 1522. The impact absorbing portion 1521 is connected to the second end portion 1512. The impact absorbing portion 1521 absorbs the impact of the first elastic element 1510. The fixed end portion 1522 is fixed to the holder 1220. Therefore, the second elastic element 1520 contacts to the holder 1220, and is not in direct contact with the pedestal 1210. When viewed along a direction that is perpendicular to the main axis M, the second elastic element 1520 is located between the pedestal 1210 and the holder 1220. When viewed along a direction that is parallel with the main axis M, the first elastic element 1510, the pedestal 1210 and the holder 1220 at least partially overlap.

Figure 9:
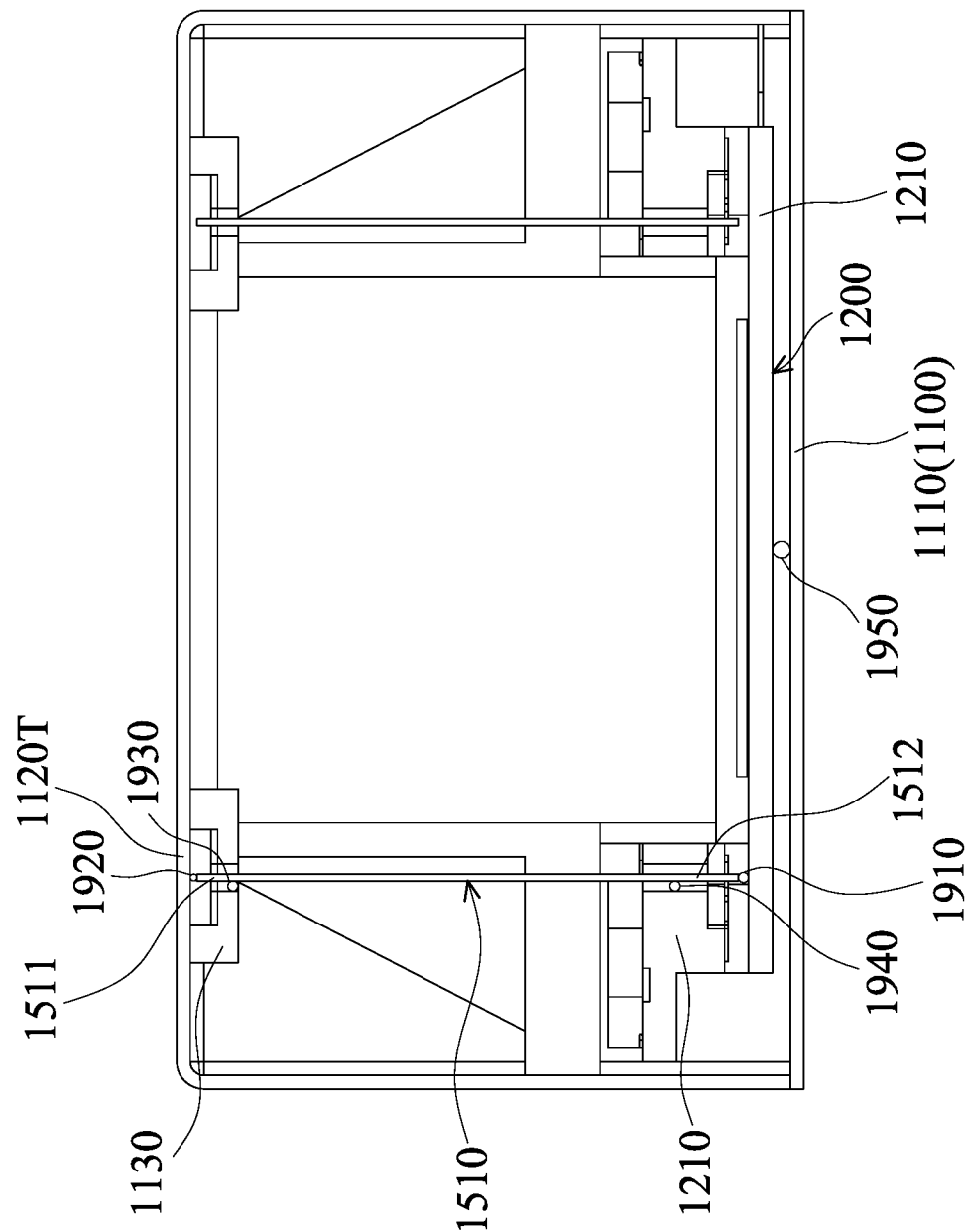
FIG. 9 is a schematic cross-sectional view of the optical module taken along the line B-B' in FIG. 3.

Refer to FIG. 4 and FIG. 9. FIG. 9 is a schematic cross-sectional view of the optical module 1000 along the line B-B' in FIG. 3. The damping assembly 1900 may have a gel material, and includes a first damping element 1910, a second damping element 1920, a third damping element 1930, a fourth damping element 1940, and a fifth damping element 1950. The first damping element 1910 is in direct contact with the first elastic element 1510 and the movable portion 1200. In more detail, the first damping element 1910 is disposed between the second end portion 1512 and the pedestal 1210. The second damping element 1920 is in direct contact with the first elastic element 1510 and the fixing portion 1100. In more detail, the second damping element 1920 is disposed between the first end portion 1511 and the top wall 1120T to avoid short-circuit causing by the first end portion 1511 contacts the top wall 1120T.

The third damping element 1930 is in direct contact with the first elastic element 1510 and the frame 1130. The fourth damping element 1940 is in direct contact with the first elastic element 1510 and the movable portion 1200. In more detail, the fourth damping element 1940 is disposed between the first elastic element 1510 and the holder 1210. The fifth damping element 1950 is in direct contact with the movable portion 1200 and the fixed portion 1100. In more detail, the fifth damping element 1950 is disposed between the movable portion 1200 and the base 1110. By providing the damping assembly 1900, the connection between the supporting assembly 1500 and the movable portion 1200 and the fixed portion 1100 may be strengthened, and the movement of the movable portion 1200 relative to the fixed portion 1100 may be stabilized.

Figure 10:
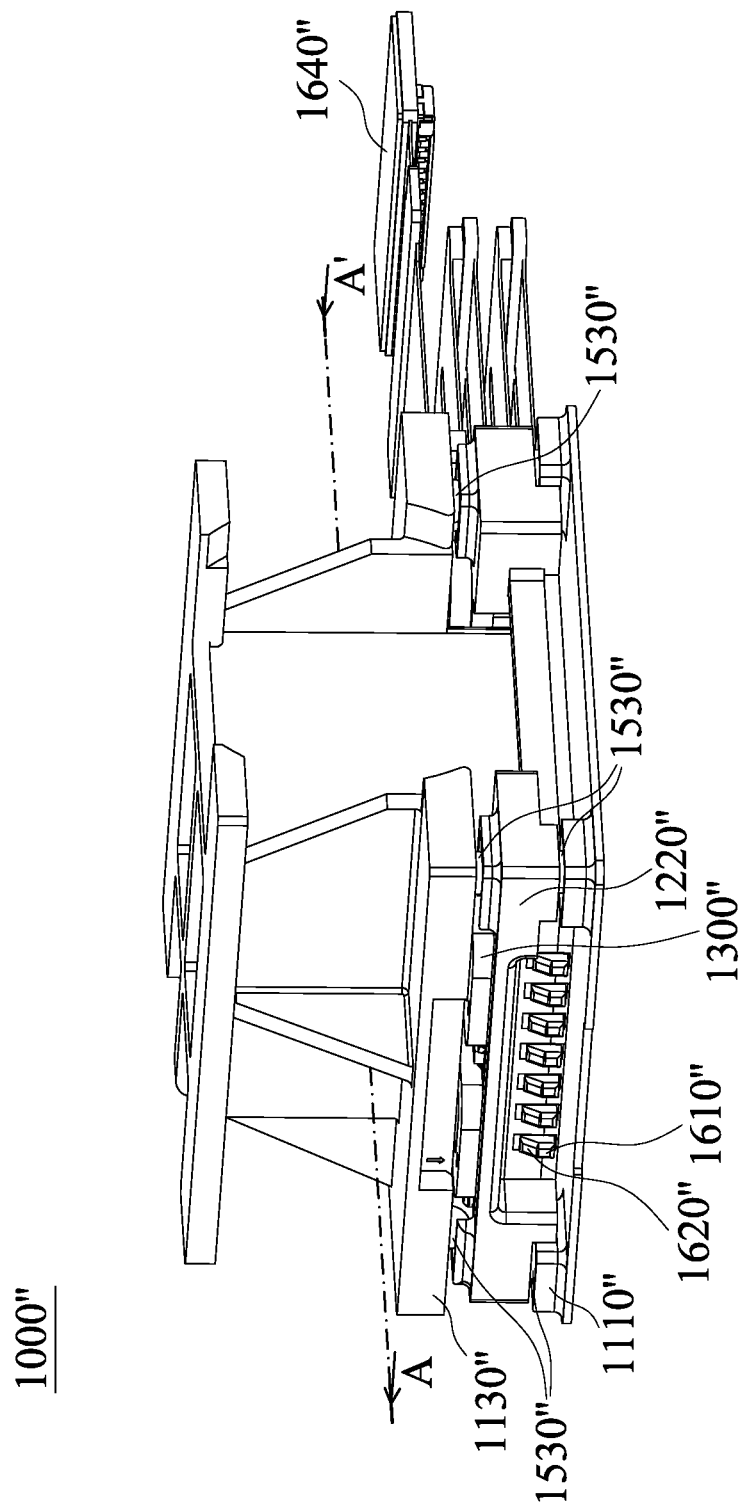
FIG. 10 is a perspective view of a partial structure of an optical module according to another embodiment of the disclosure.
Figure 11:
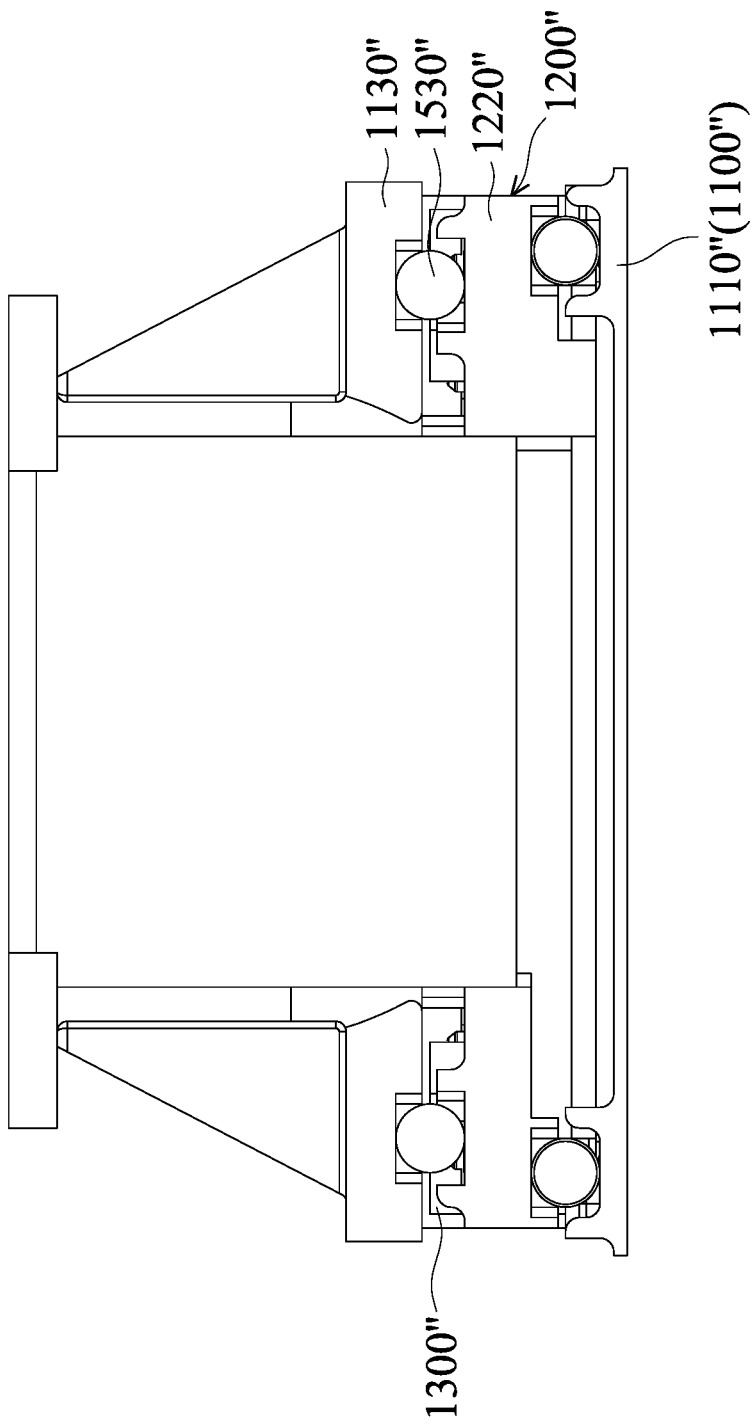
FIG. 11 is a cross-sectional view of the optical module taken along the line A-A' in FIG. 10.

In addition, an intermediate element 1530" may be used to replace the first elastic element 1510 and the second elastic element 1520 to form the supporting assembly 1500". As shown in FIG. 10 and FIG. 11, FIG. 10 is a perspective view of a partial structure of an optical module 1000" according to another embodiment of the disclosure, and FIG. 11 is a cross-sectional view of the optical module 1000" taken along the line A-A' in FIG. 10. The supporting assembly 1500" includes eight intermediate elements 1530", and each intermediate element 1530" has a spherical structure. In this embodiment, the four corners of the upper and lower sides of the holder 1220" are provided with holder recesses, and the frame 1130" is provided with four frame recesses corresponding to the holder recesses on the upper side of the holder 1220", and the base 1110" is provided with four base recesses corresponding to the holder recesses on the lower side of the holder 1220". The holder recesses, frame recesses, and base recesses respectively accommodate part of the eight intermediate elements 1530". When the driving mechanism 1300" drives the movable portion 1200" to move, the movable portion 1200" may move relative to the fixed portion 1100" by the intermediate element 1530".

Figure 12:
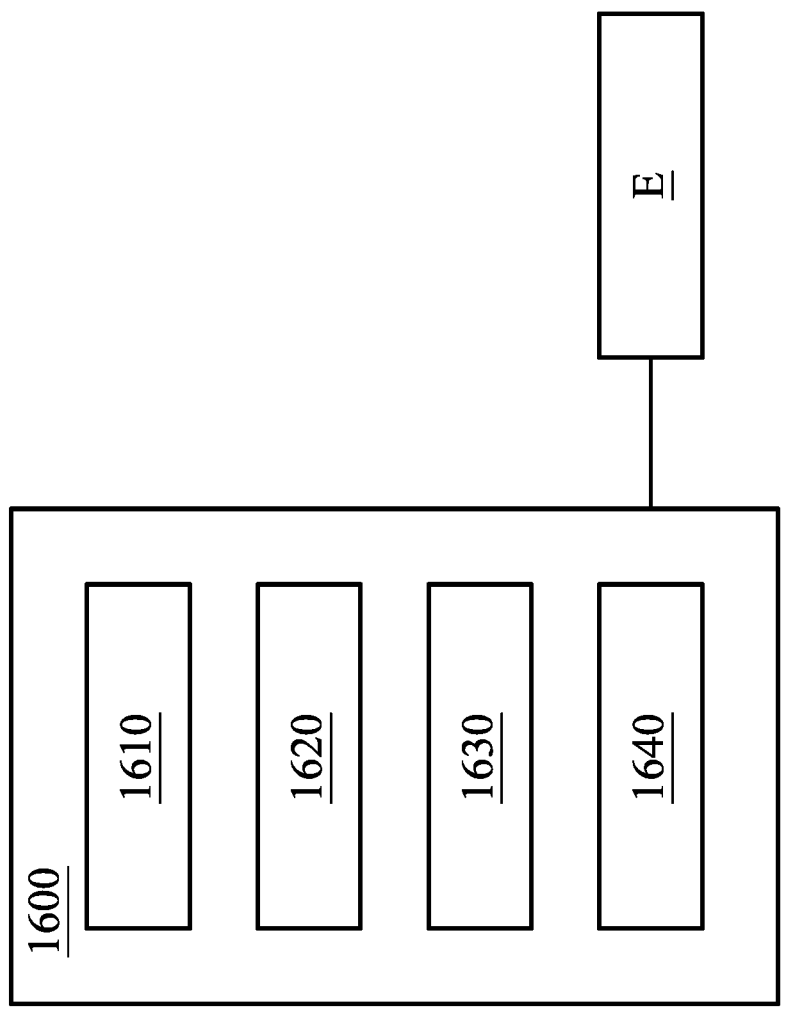
FIG. 12 is a block diagram of the circuit assembly of the optical module according to an embodiment of the disclosure.

Refer to FIG. 4 and FIG. 12. FIG. 12 is a block diagram of the circuit assembly 1600 in the optical module 1000 according to an embodiment of the disclosure. The circuit assembly 1600 is electrically connected to a circuit E located outside the optical module 1000. The circuit assembly 1600 includes a first circuit 1610, a second circuit 1620, and a third circuit 1630, and an external circuit 1640. The first circuit 1610 is fixedly disposed on the pedestal 1210, and is integrally formed with the pedestal 1210. The second circuit 1620 is fixedly disposed on the holder 1220, and is at least partially embedded in the holder 1220. The third circuit 1630 is fixedly disposed on the frame 1130 and is at least partially embedded in the frame 1130. The third circuit 1630 has a first connecting portion 1631, which is made of metal and is at least partially embedded in frame 1130, and may connect to the first end portion 1511 of the first elastic element 1510. The external circuit 1640 is connected to the circuit E outside the optical module 1000 and is connected to the first circuit 1610. The external circuit 1640 is flexible, for example, it can be a flexible printed circuit board (FPC). The external circuit 1640 has a plurality of holes H, which makes the whole body of the external circuit 1640 easier to be bent and not easier to be broken, and also makes the movable portion 1200 easier to move.

In addition, in the embodiment of FIG. 10, at least one of the first circuit 1610", the second circuit 1620", and the third circuit 1630" (not shown for embedding in the frame 1130') has a magnetically permeable material. In more detail, the second circuit 1620" has a magnetically permeable material and corresponds to the driving mechanism 1300", so that the movable portion 1200" may move close to the intermediate element 1530" by the attraction force, thus moving more stably relative to the fixed portion 1100".

Figure 13:
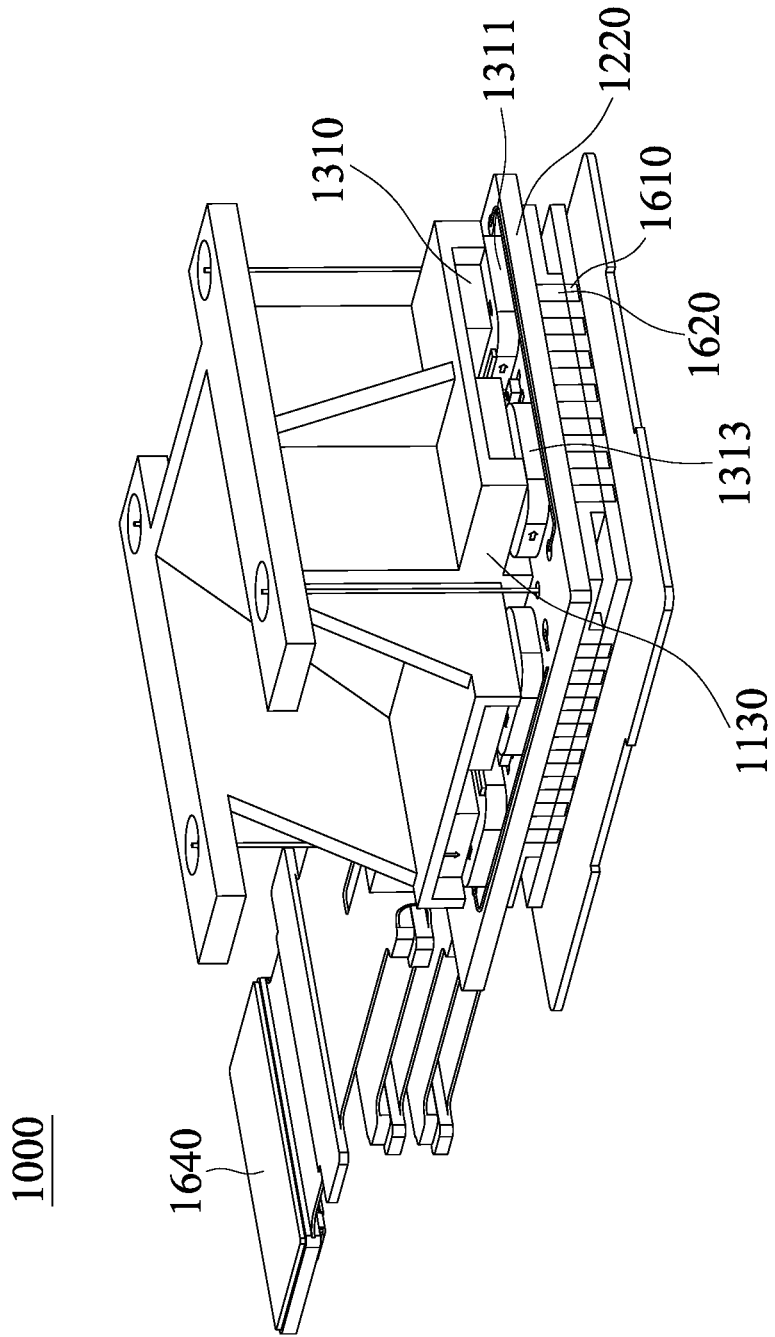
FIG. 13 is a schematic diagram of a partial structure of an optical module according to an embodiment of the disclosure.
Figure 14:
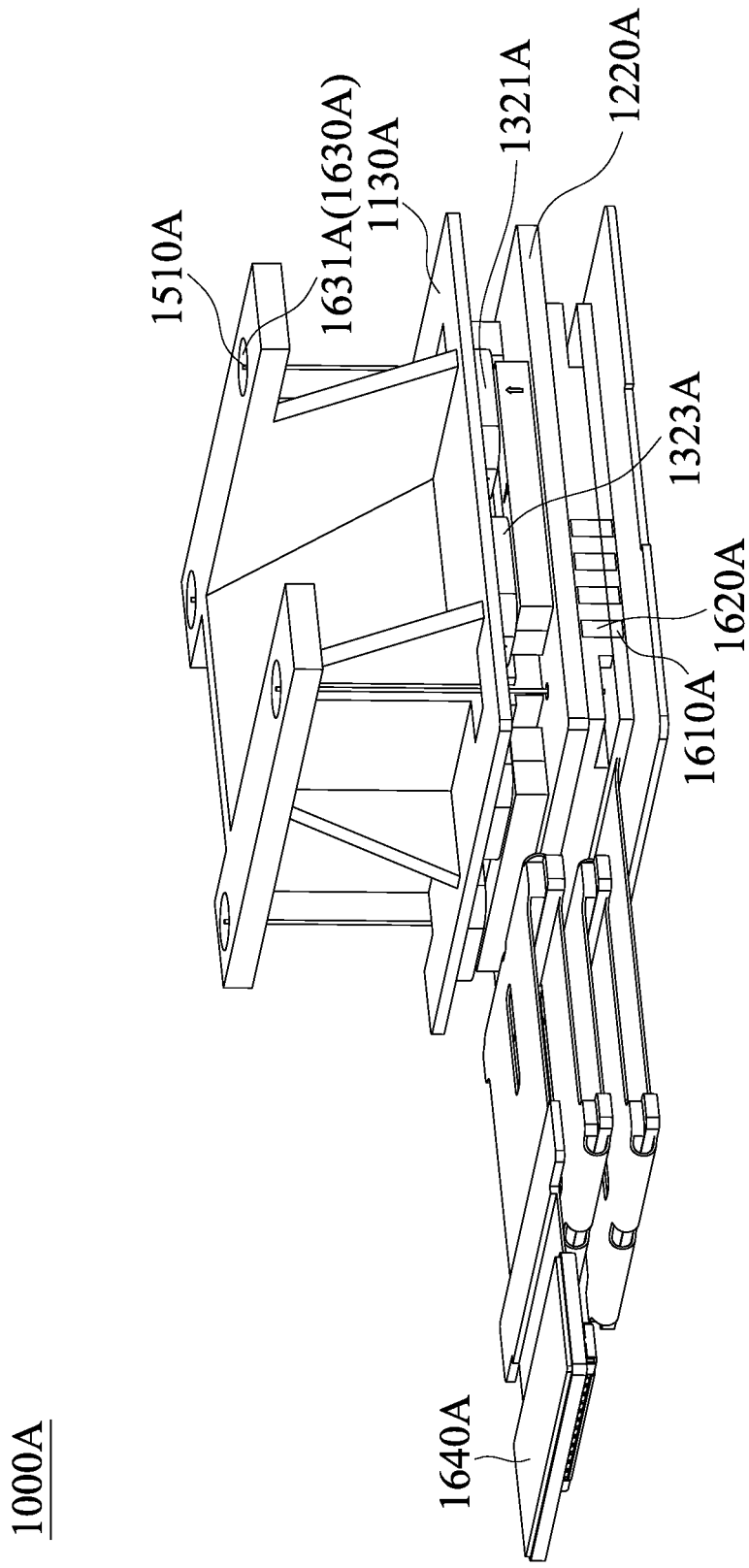
FIG. 14 is a schematic diagram of a partial structure of another optical module according to an embodiment of the disclosure.
Figure 15:
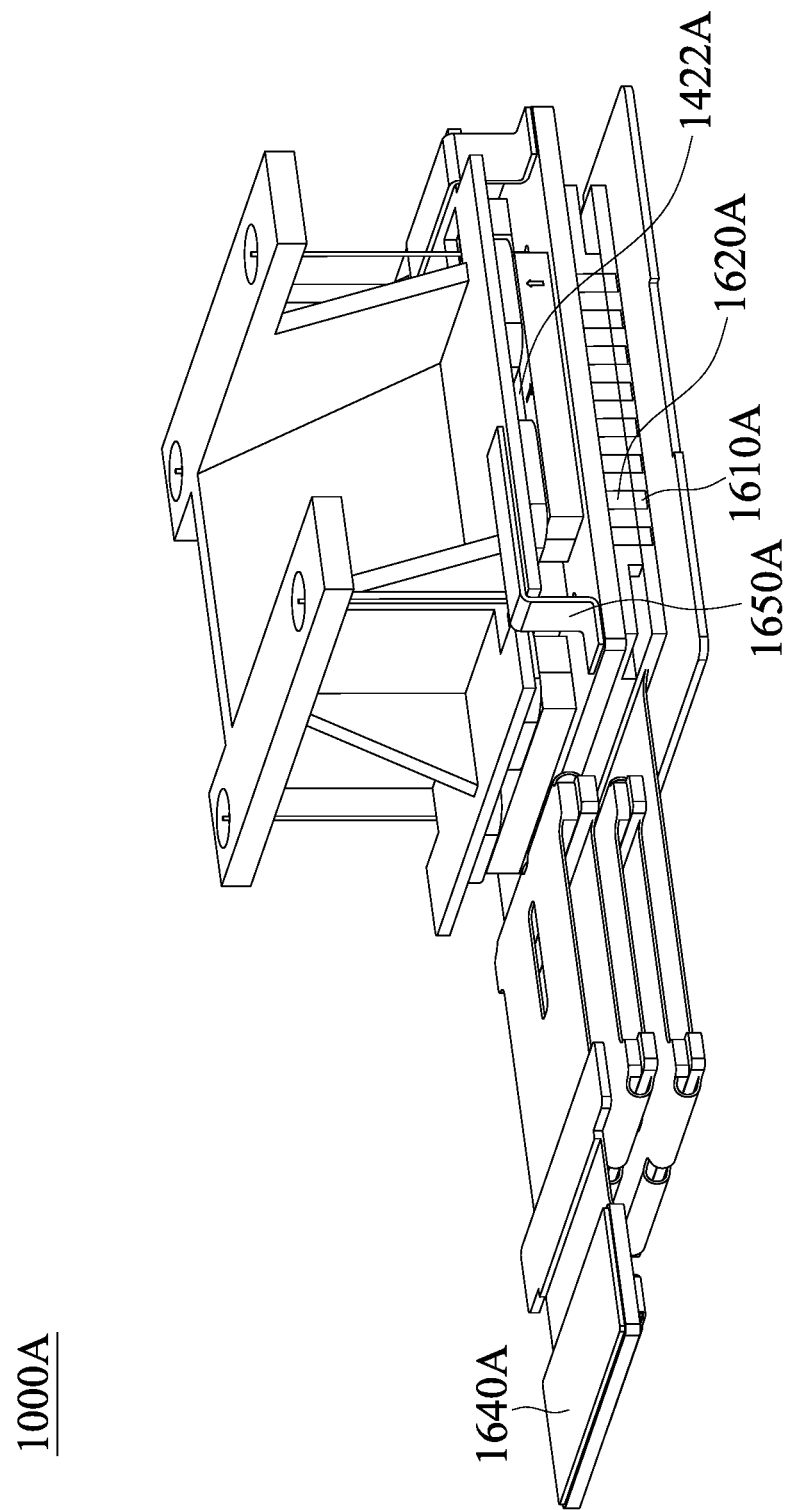
FIG. 15 is a schematic diagram of a partial structure of another optical module according to an embodiment of the disclosure.
Figure 16:
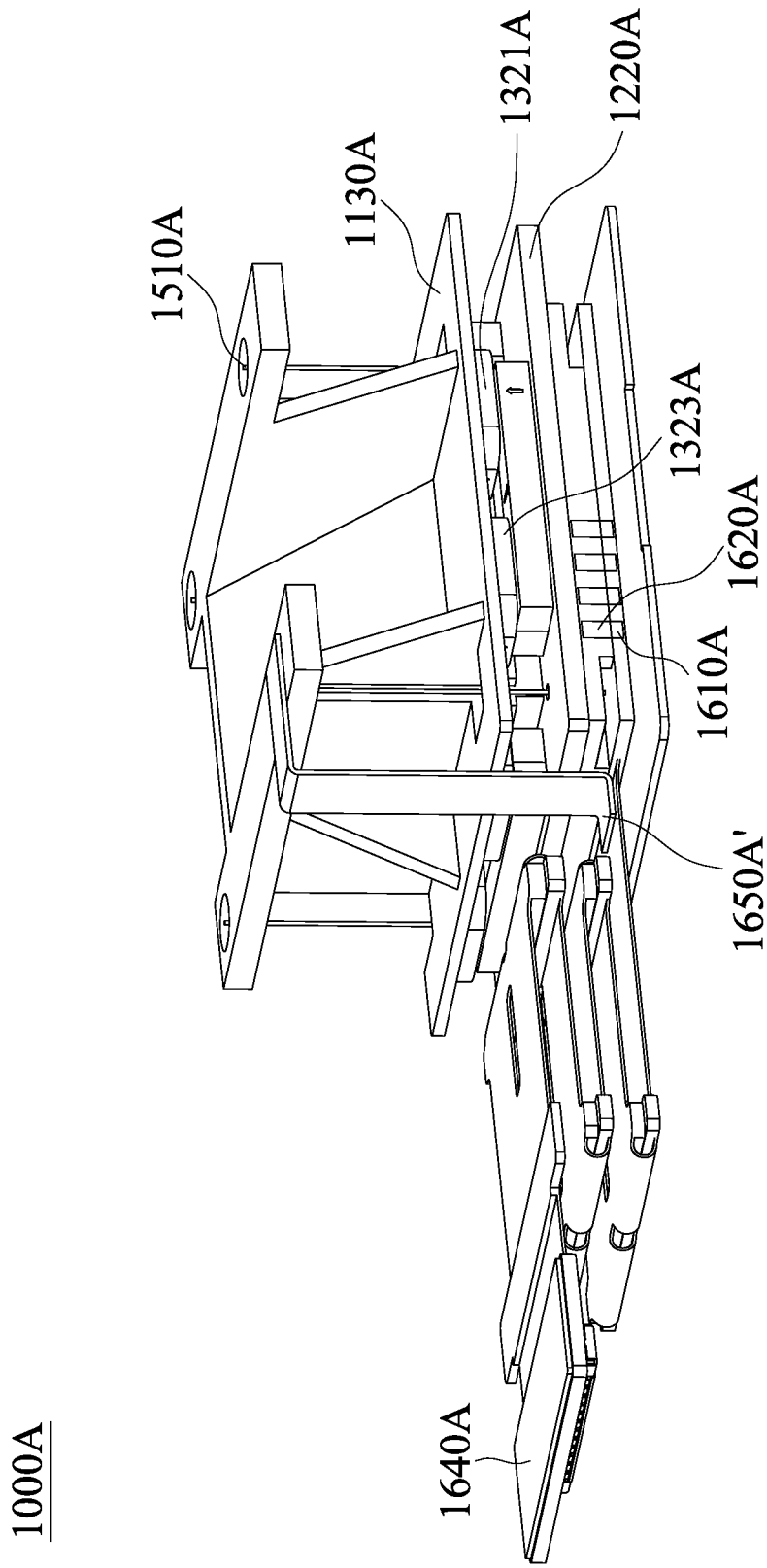
FIG. 16 is a schematic diagram of a partial structure of another optical module according to an embodiment of the disclosure.

Next, refer to FIG. 13 to FIG. 16, several different electrical connections will be described. FIG. 13 is a schematic diagram of a partial structure of an optical module 1000 according to an embodiment of the disclosure. FIG. 14 to FIG. 16 are schematic diagrams of a partial structure of an optical module 1000A according to an embodiment of the disclosure.

In the embodiment of FIG. 13, the coils are disposed on the holder 1220, and the electrical connection is illustrated by taking the first driving assembly 1310 as an example, the second driving assembly 1320 and the third driving assembly 1330 may be electrically connected in the same way. The first driving assembly 1310 is electrically connected to the second circuit 1620, and is electrically connected to the first circuit 1610 via the second circuit 1620. In more detail, the first coil 1311 and the second coil 1313 are connected to the contacts of the second circuit 1620 exposed on the surface of the holder 1220 by welding, etc., and the partial contacts of the second circuit 1620 and the partial contacts of the first circuit 1610 are arranged in cooperation. Therefore, when the holder 1220 is assembled to the pedestal 1210, the second circuit 1620 and the first circuit 1610 are electrically connected at the same time. Thus, the first driving assembly 1310 is electrically connected to the external circuit 1640 via the second circuit 1620 and the first circuit 1610 in sequence, and then electrically connected to the circuit E outside the optical module 1000 via the external circuit

1640. The second driving assembly 1320 and the third driving assembly 1330 are also electrically connected in a similar way.

In the embodiment shown in FIG. 14, the coils of the optical module 1000A are disposed on the frame 1130A, and the electrical connection is illustrated by taking the second driving assembly 1320A as an example. The first driving assembly 1310A and the third driving assembly 1330A may be electrically connected in the same way. The third coil 1321A and the fourth coil 1323A of the second driving assembly 1320A are welded to the contacts (not shown) of the third circuit 1630A on the frame 1130A, and are electrically connected to the third circuit 1630A. The first connecting portion 1631A of the third circuit 1630A is electrically connected to the first end portion 1511A of the first elastic element 1510A, and the first elastic element 1510A is electrically connected to the second elastic element. The second elastic element is connected to the contacts (not shown) of the second circuit 1620A disposed on the holder 1220A. Then, as in the embodiment of FIG. 13, the partial contacts of the second circuit 1620 and the partial contacts of the first circuit 1610 are arranged in cooperation, so that the second circuit 1620A is electrically connected to the first circuit 1610A, and electrically connected the circuit E outside the optical module 1000A via the external circuit 1640A. Therefore, the second driving assembly 1320A is electrically connected to the circuit E outside the optical module 1000A passes via the third circuit 1630A, the first elastic element 1510A, the second elastic element A, the second circuit 1620A, the first circuit 1610A, and the external circuit 1640A in sequence.

In the embodiment of FIG. 15, an intermediate circuit 1650A may also be provided on the frame 1130A, and the intermediate circuit 1650A may be a flexible printed circuit board with flexibility. The second sensing element 1422A may be electrically connected to the second circuit 1620A via the intermediate circuit 1650A, and then electrically connected to the circuit E outside the optical module 1000A via the first circuit 1610A and the external circuit 1640A in sequence.

In the embodiment of FIG. 16, the second driving assembly 1320A may also be directly connected to the external circuit 1640A via the first elastic element 1510A to be electrically connected to the circuit E outside the optical module 1000A. In other words, another intermediate circuit 1650A' may be provided on the top of the frame 1130A. The intermediate circuit 1650A' may be a flexible printed circuit board with flexibility, which is directly connected to the first elastic element 1510A and the external circuit 1640A. Therefore, the second driving assembly 1320A is connected to the circuit E outside the optical module 1000A via the third circuit 1630A, the first elastic element 1510A, the intermediate circuit 1650A', and the external circuit 1640A in sequence.

However, the electrical connection is not limited to the above-mentioned embodiments, and the configuration of the optical module 1000 may be changed in combination with the electrical connection described above as required, so that the three driving assemblies may be electrically connected in different ways. For example, in an optical module 1000B (not shown), the first driving assembly 1310B is connected to the circuit E outside the optical module 1000B via the second circuit 1620B, the first circuit 1610B, and the external circuit 1640B in sequence. The second driving assembly 1320B is connected to the circuit E outside the optical module 1000B via the third circuit 1630B, the first elastic element 1510B, the second elastic element B, the second circuit 1620B, the first circuit 1610B, and the external circuit 1640B in sequence. The third driving assembly 1330B is connected to the circuit E outside the optical module 1000B via the third circuit 1630B, the first elastic element 1510B, the intermediate circuit 1650B, and the external circuit 1640B in sequence.

In addition, in the embodiment in which the intermediate element constitutes the supporting assembly, if the coils are disposed on the holder 1220″, as shown in FIG. 10, the electrical connection is similar to the embodiment in FIG. 13. The first driving assembly 1310″ is electrically connected to the circuit E outside the optical module 1000″ via the second circuit 1620″ and the first circuit 1610″ and the external circuit 1640″ in sequence.

If the coils is disposed on the frame 1130″ (not shown), the electrical connection is similar to the embodiment in FIG. 15 and/or FIG. 16. The first driving assembly 1310″ is electrically connected the intermediate circuit 1650″ via the third circuit 1630″, and the intermediate circuit 1650″ may be electrically connected to one of the first circuit 1610″ and the external circuit 1640″, and then, electrically connected the circuit E outside the optical module 1000″ via the external circuit 1640″. In this embodiment, the first driving assembly 1310″ is electrically connected to the circuit E outside the optical module 1000″ via the third circuit 1630″, the intermediate circuit 1650″ and the external circuit 1640″ in sequence.

As described above, an embodiment of the present invention provides an optical system includes an optical module with a main axis. The optical module includes a fixed portion, a movable portion, a driving mechanism, and a supporting assembly. The movable portion is connected to an optical element and is movable relative to the fixed portion. The driving mechanism drives the movable portion to move relative to the fixed portion. The supporting assembly is connected to the movable portion and the fixed portion. When viewed along a direction that is parallel with the main axis, the fixed portion is a polygonal structure with a first side, a second side, a third side, and a fourth side, the first side is parallel with the third side, the second side is parallel with the fourth side, the first side is not parallel with the second side. The special position and size relationship of each element disclosed in the present invention may enable the optical element driving mechanism to achieve a specific direction of thinning and overall miniaturization. In addition, by applying with different optical modules, the optical element driving mechanism may further improve the optical quality (such as shooting quality or depth sensing accuracy, etc.).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An optical system, comprising:
   an optical module with a main axis, comprising;
      a fixed portion;
      a movable portion connected to an optical element and movable relative to the fixed portion;
      a driving mechanism driving the movable portion to move relative to the fixed portion;

a supporting assembly connected to the movable portion and the fixed portion; and
a circuit assembly electrically connected to a circuit located outside the optical module;
wherein when viewed along a direction that is parallel with the main axis, the fixed portion is a polygonal structure with a first side, a second side, a third side, and a fourth side;
wherein the first side is parallel with the third side, the second side is parallel with the fourth side, and the first side is not parallel with the second side;
wherein the fixed portion comprises an outer frame and a frame connected to the outer frame, a first accommodating space is formed to accommodate the movable portion and the frame, and the outer frame comprises:
a top wall having a plate-like structure and not parallel with the main axis;
a first side wall extending from a first edge of the top wall and not parallel with the top wall;
a second side wall extending from a second edge of the top wall and not parallel with the top wall;
a third side wall extending from a third edge of the top wall and not parallel with the top wall; and
a fourth side wall extending from a fourth edge of the top wall and not parallel with the top wall, wherein the fourth side wall has an opening corresponding to a light;
wherein the movable portion comprises:
a pedestal connected to the optical element and having a plate-like structure; and
a holder fixedly disposed on the pedestal;
wherein the circuit assembly comprises:
a first circuit fixedly disposed on the pedestal and integrally formed with the pedestal;
a second circuit fixedly disposed on the holder and at least partially embedded in the holder;
a third circuit fixedly disposed on the frame and at least partially buried in the frame; and
an external circuit connected to the circuit outside the optical module.

2. The optical system as claimed in claim 1, wherein the fixed portion further comprises a base having a plate-like structure and perpendicular to the main axis, and the base and the outer frame are arranged along the main axis;
wherein the top wall is parallel with the base;
wherein when viewed along a direction that is parallel with the main axis, the first side wall is disposed on the first side;
wherein when viewed along a direction that is parallel with the main axis, the second side wall is disposed on the second side;
wherein when viewed along a direction that is parallel with the main axis, the third side wall is disposed at the third side;
wherein the opening is formed between the outer frame and the base, when viewed along a direction that is parallel with the main axis, the fourth side wall is disposed on the fourth side.

3. The optical system as claimed in claim 1, wherein the optical module further comprises an optical path adjustment element connected to the frame, and a second accommodating space is formed between the frame and the movable portion to accommodate the optical path adjustment element.

4. The optical system as claimed in claim 1, wherein the driving mechanism comprises a first driving assembly disposed on the first side;
wherein the first driving assembly is electrically connected to the second circuit;
wherein the first driving assembly is electrically connected to the first circuit via the second circuit;
wherein the first driving assembly is electrically connected to the external circuit via the second circuit and the first circuit in sequence;
wherein the first driving assembly is electrically connected to the circuit outside the optical module via the second circuit, the first circuit, and the external circuit in sequence.

5. The optical system as claimed in claim 1, wherein the external circuit is flexible, and the external circuit has a plurality of holes.

6. The optical system as claimed in claim 1, wherein at least one of the first circuit, the second circuit, and the third circuit has a magnetically permeable material, and the second circuit has a magnetically permeable material and corresponds to the driving mechanism.

7. The optical system as claimed in claim 2, wherein the supporting assembly comprises a plurality of intermediate elements each having a spherical structure;
wherein an upper side and a lower side of the holder are provided with a plurality of holder recesses, the frame is provided with a plurality of frame recesses corresponding to the holder recesses on the upper side of the holder, and the base is provided with a plurality of base recesses corresponding to the holder recesses on the lower side of the holder;
wherein the holder recesses, the frame recesses, and the base recesses respectively accommodate part of the intermediate elements.

8. The optical system as claimed in claim 1, wherein the driving mechanism comprises a first driving assembly disposed on the first side, and the circuit assembly further comprises an intermediate circuit connected to one of the first circuit and the external circuit;
wherein the first driving assembly is electrically connected to the third circuit;
wherein the first driving assembly is electrically connected to the circuit outside the optical module via the intermediate circuit;
wherein the first driving assembly is electrically connected to the intermediate circuit via the third circuit;
wherein the first driving assembly is electrically connected to the circuit outside the optical module via the second circuit;
wherein the first driving assembly is electrically connected to one of the first circuit and the external circuit via the intermediate circuit;
wherein the first driving assembly is electrically connected to the circuit outside the optical module via the external circuit;
wherein the first driving assembly is electrically connected to the circuit outside the optical module via the third circuit, the intermediate circuit and the external circuit in sequence.

9. The optical system as claimed in claim 2, wherein the supporting assembly comprises:
a first elastic element having a long strip structure and extending along a direction that is parallel with the main axis; and
a second elastic element having a plate-like structure that is not parallel with the first elastic element, in contact with the holder and not in direct contact with the base, and having an impact absorbing portion that absorbs the impact of the first elastic element;

wherein when viewed along a direction that is perpendicular to the main axis, the second elastic element is located between the pedestal and the holder;

wherein when viewed along a direction that is parallel with the main axis, the first elastic element, the pedestal, and the holder at least partially overlap.

10. The optical system as claimed in claim 9, wherein the optical module further comprises a damping assembly configured to stabilize the movement of the movable portion relative to the fixed portion, comprising:

a first damping element in direct contact with the first elastic element and the movable portion;

a second damping element in direct contact with the first elastic element and the fixing portion;

a third damping element in direct contact with the first elastic element and the frame;

a fourth damping element in direct contact with the first elastic element and the movable portion; and a fifth damping element in direct contact with the movable portion and the fixed portion, wherein the fifth damping element is in direct contact with the base, and the fifth damping element is located between the movable portion and the base.

11. The optical system as claimed in claim 9, wherein the driving mechanism further comprises a second driving assembly disposed on the second side;

wherein the second driving assembly is electrically connected to the third circuit;

wherein the second driving assembly is electrically connected to the circuit outside the optical module via the first elastic element;

wherein the second driving assembly is electrically connected to the first elastic element via the third circuit;

wherein the second driving assembly is electrically connected to the circuit outside the optical module via the second elastic element;

wherein the second driving assembly is electrically connected to the second elastic element via the first elastic element;

wherein the second driving assembly is electrically connected to the circuit outside the optical module via the second circuit;

wherein the second driving assembly is electrically connected to the second circuit via at least one of the first elastic element and the second elastic element;

wherein the second driving assembly is electrically connected to the first circuit via the second circuit;

wherein the second driving assembly is electrically connected to the external circuit via the first circuit;

wherein the second driving assembly is electrically connected to the circuit outside the optical module via the external circuit;

wherein the second driving assembly is electrically connected to the circuit outside the optical module via the third circuit, the first elastic element, the second circuit, the first circuit, and the external circuit in sequence.

12. The optical system as claimed in claim 9, wherein the frame has a groove, the first elastic element has a first end portion fixed to the frame, the first end portion is received in the groove and located between the frame and the top wall, and the first end portion is not in direct contact with the top wall.

13. The optical system as claimed in claim 12, wherein the third circuit has a first connecting portion connected to the first end portion, the first connecting portion is made of metal material, and the first connecting portion is at least partially embedded in the frame.

14. The optical system as claimed in claim 2, wherein the optical module further comprises a dust-proof assembly to limit path of foreign objects to prevent foreign objects from contacting the optical element;

wherein the dust-proof assembly has a higher viscosity to catch foreign objects;

wherein when viewed along a direction that is parallel with the main axis, the dust-proof assembly and the optical element do not overlap, the dust-proof assembly is located around the optical element, and the dust-proof assembly has a closed structure surrounding the optical element;

wherein the dust-proof assembly is at least partially disposed on the pedestal;

wherein the dust-proof assembly is at least partially disposed on the holder.

15. The optical system as claimed in claim 2, wherein the optical module further comprises a heat dissipation assembly configured to improve the heat dissipation efficiency of the optical element and the driving mechanism, comprising:

a first heat dissipation element having a plate-shaped structure, having a material of carbon fiber, ceramic or metal material, and having a thermal conductivity greater than 10 W/(m×K), wherein the first heat dissipation element and the base have an integral structure, and the first heat dissipation element is closer to the optical element than the top wall; and a second heat dissipation element having a plate-shaped structure, having a magnetically permeable material to improve the driving efficiency of the driving mechanism, and having a thermal conductivity greater than 10 W/(m×K), wherein the second heat dissipation element is fixedly disposed on the pedestal and at least partially embedded in the pedestal, and the second heat dissipation element corresponds to the driving mechanism to generate an attractive force or a repulsive force;

wherein the second heat dissipation element is parallel with the first heat dissipation element;

wherein a gap greater than zero is formed between the first heat dissipation element and the second heat dissipation element.

16. The optical system as claimed in claim 1, wherein the optical module further comprises an optical path adjustment element configured to adjust a travel direction of the light entering the optical module from a direction that is parallel with the first side to a direction that is parallel with the main axis, and wherein when viewed along a direction that is parallel with the main axis, the light enters the optical module from the fourth side.

17. The optical system as claimed in claim 16, wherein the optical module further comprises an anti-vibration driving mechanism driving the optical path adjustment element to move relative to the fixed portion;

wherein when viewed along a direction that is parallel with the main axis, the anti-vibration driving mechanism is disposed on the second side, and the anti-vibration driving mechanism and the driving mechanism at least partially overlap;

wherein the anti-vibration driving mechanism drives the optical path adjustment element to rotate in a first rotating axis relative to the fixed portion, and the first rotating axis is parallel with the second side.

18. An optical system, comprising:

an optical module with a main axis, comprising;

a fixed portion;

a movable portion connected to an optical element and movable relative to the fixed portion;

a driving mechanism driving the movable portion to move relative to the fixed portion;

a supporting assembly connected to the movable portion and the fixed portion; and a heat dissipation assembly configured to improve the heat dissipation efficiency of the optical element and the driving mechanism;

wherein when viewed along a direction that is parallel with the main axis, the fixed portion is a polygonal structure with a first side, a second side, a third side, and a fourth side;

wherein the first side is parallel with the third side, the second side is parallel with the fourth side, and the first side is not parallel with the second side;

wherein the fixed portion comprises an outer frame and a base having a plate-like structure, the base is perpendicular to the main axis, the base and the outer frame are arranged along the main axis, and the outer frame comprises:

a top wall having a plate-like structure, parallel with the base, and not parallel with the main axis, wherein the top wall is parallel with the base;

a first side wall extending from a first edge of the top wall and not parallel with the top wall, wherein when viewed along a direction that is parallel with the main axis, the first side wall is disposed on the first side;

a second side wall extending from a second edge of the top wall and not parallel with the top wall, wherein when viewed along a direction that is parallel with the main axis, the second side wall is disposed on the second side;

a third side wall extending from a third edge of the top wall and not parallel with the top wall, wherein when viewed along a direction that is parallel with the main axis, the third side wall is disposed at the third side; and a fourth side wall extending from a fourth edge of the top wall and not parallel with the top wall, wherein the fourth side wall has an opening corresponding to a light, the opening is formed between the outer frame and the base, and wherein when viewed along a direction that is parallel with the main axis, the fourth side wall is disposed on the fourth side;

wherein the movable portion comprises:

a pedestal connected to the optical element and having a plate-like structure; and a holder fixedly disposed on the pedestal;

wherein the heat dissipation assembly comprises:

a first heat dissipation element having a plate-shaped structure, having a material of carbon fiber, ceramic or metal material, and having a thermal conductivity greater than 10 W/(m×K), wherein the first heat dissipation element and the base have an integral structure, and the first heat dissipation element is closer to the optical element than the top wall; and a second heat dissipation element having a plate-shaped structure, having a magnetically permeable material to improve the driving efficiency of the driving mechanism, and having a thermal conductivity greater than 10 W/(m×K), wherein the second heat dissipation element is fixedly disposed on the pedestal and at least partially embedded in the pedestal, and the second heat dissipation element corresponds to the driving mechanism to generate an attractive force or a repulsive force;

wherein the second heat dissipation element is parallel with the first heat dissipation element;

wherein a gap greater than zero is formed between the first heat dissipation element and the second heat dissipation element.

19. The optical system as claimed in claim 18, wherein the optical module further comprises a frame connected to the outer frame, and a first accommodating space is formed to accommodate the movable portion and the frame.

20. The optical system as claimed in claim 19, wherein the optical module further comprises an optical path adjustment element connected to the frame, and a second accommodating space is formed between the frame and the movable portion to accommodate the optical path adjustment element.

* * * * *